United States Patent

[11] 3,624,027

[72] Inventors Jean Pierre Wauquier
Le Vesinet;
Jean Gaillard, Carrieres/Seine; Maseh Osgan, Paris; Marc Mollard, Colobes, all of France
[21] Appl. No 770,097
[22] Filed Oct. 23, 1968
[45] Patented Nov. 30, 1971
[73] Assignee Institut due Francais du Petrole des Carburanto et Lubrifiants
Haute de Seine, France
[32] Priorities Oct. 27, 1967
[33] France
[31] 126282;
Oct. 31, 1967, France, No. 126694

[54] MANUFACTURE OF POLYMERS AND RESULTING POLYMERS
14 Claims, No Drawings
[52] U.S. Cl. .................................................. 260/45.9 R,
260/2 A, 260/45.75 R, 260/79
[51] Int. Cl. .................................................. C08g 43/00

[50] Field of Search ........................................ 260/45 9,
45 75 R, 2 A

[56] References Cited
UNITED STATES PATENTS

| | | | |
|---|---|---|---|
| 3,116,267 | 12/1963 | Dolce | 260/45.9 |
| 3,284,374 | 11/1966 | Daimon et al. | 260/2 EPA |
| 3,313,740 | 4/1967 | Durst | 260/2 EPA |
| 3,345,347 | 10/1967 | Elfers et al. | 260/2 EPA |
| 3,432,445 | 3/1969 | Osgan et al. | 260/2 EPA |

*Primary Examiner*—Donald E. Czaja
*Assistant Examiner*—Eugene C. Rzucidlo
*Attorney*—Craig, Antonelli, Stewart & Hill

ABSTRACT: Stabilized polymers and copolymers of saturated cyclic ethers, such as epoxypropane, are obtained by contacting the ether with a catalyst obtained by reacting a trivalent metal compound with a divalent metal compound, such as an organo-aluminum-zinc compound, and stopping the reaction by adding an amine or amide to the reaction system. Aniline is a particularly preferred polymerization stopper. The catalytic residue must be left in the polymerizate.

MANUFACTURE OF POLYMERS AND RESULTING POLYMERS

This invention relates to a method for stopping the polymerization of cyclic ethers, which method simultaneously constitutes a process for improving the stabilization of the obtained polymer with respect to the detrimental effects of the residual catalyst, heat and oxygen.

The invention also relates to the vulcanization of the resulting stabilized polymers.

The methods for stopping polymerizations and vulcanizing polymers according to this invention apply to the catalysts obtained by reaction of a trivalent metal compound

with a divalent metal compound

YO—M—Z     (B)

where M' is a trivalent metal, M a divalent metal, Z a —OR$_3$ or acyloxy radical, one of X and Y is a R$_4$ radical and the other is an acyl radical, R$_1$, R$_2$, R$_3$ and R$_4$ being monovalent hydrocarbon radicals; during this reaction a secondary product of formula XOY is separated. In these catalysts, the molar ratio of the reactants A/B is usually comprised between 0.01 and 100, preferably between 0.1 and 10. These catalysts are described for example in the Belgian Pat. No. 680,456 (corresponding to U.S. Pat. No. 432,445);

These catalysts may be modified in several manners, for example by hydrolysis (French Pat. application No. 86,080 of Dec. 2, 1966) corresponding to U.S. Pat. No. 3,520,827; or by alcoholysis (French Pat. application No. 129,123 of Nov. 21, 1967) corresponding to U.S. application Ser. No. 777,893.

As preferred metals, in the above catalyst, there will be mentioned aluminum and zinc. The above patents also relate to the polymerization of cyclic ethers, particularly epoxides, by means of the said catalysts.

It is well-known that the homo- and co-polymers of the saturated epoxides, as well as all polyethers, are very sensitive to degradation under the effect of oxygen, heat and light. Consequently they must be stabilized in order to maintain their useful properties.

The known stabilization processes, however, are not satisfactory.

It has now been discovered, and this is one object of this invention, that, by addition of at least one amine or amide, such as hereafter defined, to the polymerization mixture, in order to stop said polymerization, there are obtained polymers containing metallic catalytic residues together with the stopping agent, said polymers exhibiting an outstanding stability: their properties (for example molecular weights and distribution of the latter) are remarkably retained even in the presence of such decomposition agents as heat and oxygen.

The additive is added when the molecular weight of the polymer has attained a satisfactory value, corresponding for example to an intrinsic viscosity higher than one and preferably comprised between three and 10, as determined in toluene at 30° C.

This invention also relates to the industrial products consisting of these polymers containing metallic residues together with amines or amides of a given class, that exhibit a greatly improved stability, as well as to the manufacture thereof.

The advantages of this process, as well as the utility of the thus stabilized polymers will appear thereafter.

It is obviously of high interest to be able to stop the polymerization at the desired moment, since otherwise the resulting polymer tends to alter: for example the catalyst may be responsible for a degradation of the formed polymer, which is the case with the above-mentioned catalysts.

The stopping process of this invention comprises an immediate stopping of the evolution of the formed polymer, which provides for the obtainment of a polymer exhibiting the optimal properties for the contemplated use.

The utility of such a process is obvious since there will be surely a contact of the polymerizate with the catalyst during the separation of the polymer (evaporation, precipitation, washing, filtration and the like).

On the other hand, it is known that it is necessary to add oxidation inhibitors in order to inhibit a degradation of the polymer by oxygen, preferably before the polymerizate is exposed to air. It is known that often the metallic residues, for example those from the catalyst, have a detrimental effect on the stability of the polymer. They may either catalyze the oxidation of the polymer or accelerate the destruction of the used oxidation inhibitor. Thus it is often necessary to eliminate the metallic catalytic residues. However it would be more economical to keep them in the polymer provided that their detrimental effects could be prevented.

Some heavy amines are known for their oxidation inhibiting properties, for example N-phenyl-β-naphthylamine which is known as a powerful oxidation inhibitor. Other amines, such as aniline or diphenylamine, have a poor intrinsic antioxygen effect, although they stop satisfactorily the polymerizations according to this invention.

It has now been found that the polymer which is obtained when the polymerization is stopped by means of an amine such as defined hereafter, for example aniline, and in which the catalytic residues as well as the amine or amide are present, exhibits a stability with respect to oxidation which is higher than that obtained by addition of the same amine or amide to an identical polymer which has been previously made free from catalytic residues. It is further essential that the catalytic residues be those of the said M and M' metals.

The advantages of this invention result from the following facts:

1– It provides for an efficient stopping of the polymerization.

2– It makes unnecessary and even detrimental an elimination of the catalytic residues in a later stage.

3– It gives a high stability to the obtained polymer.

4–It does not substantially color the polymer.

5– It allows the use, as co-stabilizers (in association with metallic residues) of amines of low cost such as aniline.

In order to obtain the stabilization effect, it is necessary to add the amine or amide to the polymerization mixture when it is desired to stop the polymerization, i.e. at a moment when the catalyst retains an activity (thus before addition of a substance, which is able to deactivate the catalyst or extract it. The use of such substances is even detrimental).

In fact, if the polymerization is stopped by addition of an excess of water, i.e. at least about 3 moles of water per gramatom of catalyst determined as total of trivalent and bivalent metals, and if the amine is added thereafter, the stabilization effect is greatly reduced.

Consequently, the process of this invention results into two effects: the polymerization stopping and the polymer stabilization.

The product of the invention, which is characterized by its great stability, consists of the polymer containing the catalytic residues and the added amine or amide.

The polymerization stopping time is dependent on the desired conversion of the monomer to polymer. It is obvious that the latter is dependent either on the particular polymerization process or on the properties of the polymer corresponding to said conversion.

The exact composition of the species which stabilizes the polymer is not known with certainty. However it is thought to be a product of addition of the amine or amide with the catalyst. In any case, during the evaporation of the solvent and/or precipitation of the polymer, this composition of matter must remain in the polymer. This excludes obviously the treatments of the polymerizate with strong acids which could destroy the composition and extract the metallic residues.

The most efficient amines conform to formula I:

where n is 1 or 2. C is a hydrocarbon radical, preferably alkyl, cycloalkyl or aryl, of valency n, preferably containing one to 20 carbon atoms, and A and B are either a hydrogen atom or a monovalent hydrocarbon radical preferably containing one to 20 carbon atoms. As examples of such radicals, there will be mentioned: alkyl of one to 20 carbon atoms, cycloalkyl of three to 20 carbon atoms, aryl of six to 20 carbon atoms, arylalkyl and alkylaryl of seven to 20 carbon atoms.

The aryl, arylalkyl and alkylaryl radicals may be substituted, on the aryl residue, with one to three halogen atoms, particularly chlorine, and/or one to three alkoxy groups, each containing from one to 12 carbon atoms.

A preferred class of amines comprises the amines of formula I where A is defined as above, B is hydrogen and C is an aromatic radical preferably containing six to 20 carbon atoms, for example: aniline, diphenylamine, N-methyl N-phenylamine, N-isopropyl N-phenylamine, N-isobutyl N-phenylamine, N-tertbutyl N-phenylamine, N-cyclohexyl N-phenylamine, and N-phenyl N-benzylamine Another more preferred class comprises the N-monoalkyl anilines, and more particularly, aniline A further preferred class of compounds comprises the above amines in which an acyl group such as RCO— is substituted for a hydrogen atom, R being hydrogen or a hydrocarbon monovalent radical preferably containing one to 20 carbon atoms. There will be mentioned by way of example formanilide, benzanilide, N,N-diphenyl propionamide, N,N-diphenyl laurylamide, N-phenyl N-methyl propionamide, N-isopropyl N-phenylbenzamide, N-isopropyl N-phenylacetamide, N-phenyl N-cyclohexyl formamide, N-cyclohexyl N-phenylstearylamide, and N-phenyl N-benzylformamide A mixture of several amines or amides may also be used.

The desired effect (stopping and stabilization) may be obtained with only 0.05 mole of amine or amide, or mixture thereof, per gram-atom of the divalent metal of the catalyst.

However larger amounts are preferred, particularly 0.3 to 3 gram-molecule per gram-atom of divalent metal. Larger amounts, although not excluded, would be superfluous and even detrimental to the vulcanization.

The amine or amide may be used as such or dissolved in an inert solvent such as heptane cyclohexane, benzene, toluene, dioxane, tetrahydrofuran ethyl ether, acetone. It may be added to the polymerization mixture either stepwise in small amounts or entirely at the same time For a detailed description of the polymers to which the invention applies, reference is made to the above-mentioned Belgian Pat. the content of which is included herein by way of reference It has also been surprisingly found that the vulcanization by means of peroxides together with sulfur or sulfur derivatives, for example alkylthiuram sulfides, sulfur dichloride, thiazoles such as mercaptobenzothiazole and organic disulfides, applied to the polymers or copolymers of saturated cyclic ethers containing catalytic residues, such as defined above, stopped and stabilized by means of an amine or amide as defined herein, resulted in the formation of gums the properties of which such as, for example, breaking load, module, lengthening at rupture, hardness, are better than those of the gums obtained by vulcanization of polymers and copolymers stabilized by the same amines or amides added when the catalyst has been deactivated or removed It has been observed that the amines normally used as stabilizers in the prior art normally have a detrimental effect on the vulcanization by means of peroxides and that it was consequently difficult to use conventional stabilizers and to obtain at the same time a vulcanizate exhibiting satisfactory properties, the most efficient stabilizers being frequently those which inhibit the vulcanization by means of peroxides. The process of this invention has the double advantage of resulting in an excellent stabilization of the final product and of substantially not interfering with the vulcanization by means of peroxides, particularly when a moderate proportion of amine or amide has been used, preferably 0.3 to 3 gram-mole per gram-atom of divalent metal of the catalyst The used peroxides are those conventionally employed in that type of vulcanization, the preferred peroxides being the diperoxides and more particularly those in which two peroxide groups are fixed on the same carbon atom, since they are more active at low temperature and give off less odor during the vulcanization and the subsequent storage. According to a particular embodiment, the diperoxide, which is used as such or as mixture with a filler such as calcium carbonate, conforms to the formula:

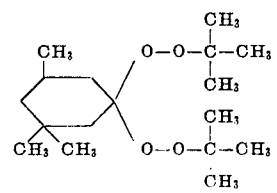

The peroxides are the same as those which are useful for the vulcanization of GRS rubber, nitrile rubber, silicone rubber and acrylic rubbers, and for the curing of polyethylene and polypropylene. As examples, there will be mentioned tertbutyl peroxide, cumene hydroperoxide, diisopropylbenzene dihydroperoxide, perbenzoic acid and perbenzoic esters.

The peroxide is used in an amount corresponding to 0.5 to 15 parts and preferably two to six parts by weight of peroxide at 40 percent in an inert filler, per 100 parts i.e. respectively 1.25 to 37.5 parts and five to 15 parts by weight of pure peroxide per 100 parts of crude gum.

The amount of used sulfur or sulfur compound ranges from 0.2 to four and preferably from 0.5 to two parts by weight per 100 parts of crude gum.

The vulcanization time is usually in the range of five to 65 minutes at a temperature of about 110° to 160° C, these values being only illustrative and not limitative.

The process of this invention applies not only to the pure gum but also to the mixtures comprising the gum and the fillers, for example carbon black and clear charges (for example silica, clay carbonates and silicates).

The following nonlimitative examples are illustrative of this invention

STABILIZATION

The polymerization of epoxypropane has been carried out at 50° C according to the above-referred patents. 11.6 parts by weight of epoxypropane, 125 parts by weight of n-heptane and 0.01 gram-atom (trivalent metal + bivalent metal) of catalyst according to said patents, have been used, said catalyst being preferably based on aluminum and zinc.

The experiments have been carried out in a tight polymerization vessel, provided with a manometer. The stopping agent is added by means of a syringe provided with a needle, through the rubber cap. The acute stopping of the pressure drop resulting from the consumption of epoxypropane is considered as indicative of the polymerizaton end.

In a comparative experiment, the polymerization has been stopped by means of 6 g. mol. of acetylacetone per gram-atom of the catalytic metals. Then the thus stopped mixture has been diluted with toluene, washed first with citric acid and then with water and an aqueous solution of sodium bicarbonate and finally with water up to neutrality. The "deashed" polymers result from this treatment. Conversely for the polymers which are not mentioned as "deashed," the treatment with acetylacetone and citric acid has been omitted. The isolation of the polymer, in all cases, has been obtained as follows: the polymer solution was poured into an evaporating vessel and dried at room temperature in an air current by slow evaporation of the solvent.

The compounds which have been used in the stabilization experiments with the "deashed" polymers have been added to the solution of the polymer before the drying of the latter.

In the case of the "nondeashed" polymers, the stopping and stabilizing agent was added when the conversion to the polymers had attained a value of about 70–80 percent. The solid amines have been added as a solution in toluene. The polymers have been isolated thereafter by evaporation of the solvent in the above-mentioned manner.

The induction periods have been determined by measurement of the oxygen absorption by the polymer in the form of a solution in orthodichlorobenzene at 130° C. This method is similar to that described by V. L. DULOG and G. STORK in Makromol. Chem. 91, 50 (1966). The induction period is defined as the time which elapses before an efficient oxygen absorption takes place. The concentration of polymer (inclusive of the additives and catalysts residues, if mentioned) was 50 g. per liter.

The ageing treatments, in an aerated oven, are carried out on samples of a constant thickness of 1 mm. The amine is incorporated to the polymer as pointed out herebefore.

The intrinsic viscosities [$\eta$] have been determined, on toluenic solutions at 30° C. in a viscosimeter of the dilution type ASTM-D-445.

The intrinsic viscosity is obtained by extrapolation from at least four figures relating to varied concentrations, and this is expressed in dl./g. units (see P. J. FLORY, Principles of Polymer Chemistry, Cornell University Press, 1953, pages 309-310). The fall of the polymer corresponds to the state of the polymeric sheet for which it has lost at normal temperature all its mechanical properties.

Examples 1 to 3, 11 to 14 and 18 to 29 are included by way of comparison but are no part of this invention.

Example 14 shows that aniline has no stabilizing effect in the absence of the catalytic residues. Example 14B shows that the combination catalyst + aniline is less active when it is added to previously deashed polymer;

TABLE III.—STABILITY OF THE DEASHED POLYEPOXYPROPANE IN THE PRESENCE OF SEVERAL AMINES

T=130° C.; 45 g./l. polymer; 0.045 g./l. amine

| Ex. No. | Amine | Induction period in minutes |
|---|---|---|
| 18 | Aniline | 0 |
| 19 | p-Aminophenol | 653 |
| 20 | N-cyclohexyl N'-phenyl p-phenylene diamine | 98 |
| 21 | N,N'-diphenyl p-phenylenediamine | 119 |
| 22 | N-isopropyl N'-phenyl p-phenylene diamine | 247 |
| 23 | N,N'-di-$\beta$-naphthyl p-phenylene diamine | 25 |
| 24 | N,N'-di-sec butyl p-phenylenediamine | 310 |
| 25 | N-phenyl-$\beta$-naphthylamine | 50 |

The above examples show that, in the absence of catalytic residues the stabilizing effect of the above amines is poor.

These figures show that the aromatic amines are substantially more active than the saturated amines.

EXAMPLE 37

Example 15 is repeated, except that an aluminum-cobalt catalyst is used instead of an aluminum-zinc catalyst. The induction period at 130° C. of the polymer whose polymerization has been stopped with aniline (molar ratio aniline/cobalt = 2) is higher than 1,500 minutes.

EXAMPLE 38

Example 15 is repeated, except that a mixture of amines, consisting of isopropylamine and N,N'-di-sec-butyl-p-phenylene diamine by equal weights, is substituted for aniline. The polymerization is stopped by means of two parts by weight of

TABLE I.—EFFECT OF STOPPING AGENTS ON THE POLYMERIZATION OF EPOXYPROPANE

N=negative; P=positive (immediate stopping)

| Example No. | Catalyst [1] Divalent metal | Catalyst [1] Trivalent metal | Stopping agent | Molar ratio stopping agent/ divalent metal | Observed effect |
|---|---|---|---|---|---|
| 1 | Zn | Al | Water | 1 | N |
| 2 | Zn | Al | do | 3 | P |
| 3 | Zn | Al | Methanol | 1 | N |
| 4 | Zn | Al | Aniline | 0.1 | P |
| 5 | Co | Al | do | 0.1 | P |
| 6 | Mn | Al | N-methyl aniline | 0.1 | P |
| 7 | Fe | Fe | Aniline | 0.5 | P |
| 8 | Zn | Al | Diphenylamine | 0.1 | P |
| 9 | Zn | Al | N-phenyl N-isopropyl amine | 0.3 | P |
| 10 | Zn | Al | N,N-diphenyl formamide | 0.5 | P |
| 10A | Zn | Al | n-Butylamine | 0.1 | P |

[1] According to Belgian Patent No. 680,456.

TABLE II

Stability of polyepoxypropane with respect to oxidation

The polymerization is carried out with a catalyst based on zinc and aluminum (Al/Zn=2, Belgium Pat. No. 680,456) and is stopped by use of several agents in an amount of 1 (3 in the case of water) gram-mol. per 1 gram-atom of zinc. The metallic residues of the catalyst (examples 12, 13 and 15–17) and the stopping agent are left in the polymer.

| Example No. | Stopping agent | Induction period in minutes | Intrinsic viscosity after— 0 hr. | Intrinsic viscosity after— 100 hrs. | Intrinsic viscosity after— 450 hrs. | Fall of sample, hrs. |
|---|---|---|---|---|---|---|
| 11 | Deashed [1] | 0 | 4.8 | | | <24 |
| 12 | Water (ratio 3) | 10 | 5.8 | 3.9 | | 400 |
| 13 | Water (ratio 3) then aniline [2] | 60 | 5.7 | 3.5 | 0.8 | 400 |
| 14 | Deashed [1] plus aniline [2] | 0 | 5.1 | | | <24 |
| 14B | Deashed plus catalyst plus aniline [3] | 500 | 5.2 | 3.1 | 0.9 | 500 |
| 15 | Aniline | >3,000 | 5 | 4.8 | 4 | >2,000 |
| 16 | Diphenylamine | >4,400 | 9.7 | 8.5 | 7.9 | >2,000 |
| 17 | N-phenyl N-cyclohexylamine | >4,700 | 7.8 | 7.1 | 6.7 | >2,000 |

[1] This polymer has been made free from the catalytic residues.
[2] The amount of added aniline per part of polymer corresponds to that of Example 15, i.e. 0.0378 part by weight per part of polymer.
[3] The amounts of catalyst and aniline are the same as those of Example 14.

TABLE IV.—STABILITY OF POLYEPOXYPROPANE WITH RESPECT TO OXIDATION

T=130° C.; 50 g./l. POLYMER

| | Amine | | |
|---|---|---|---|
| Example No. | Nature | Ratio amine divalent metal | Induction period in minutes |
| 26 | Diisobutylamine | 1 | 190 |
| 27 | Cyclohexylamine | 1 | 220 |
| 28 | N-butylamine | 1 | 240 |
| 29 | Iso-propylamine | 2 | 300 |
| 30 | o-Toluidine | 1 | >1,500 |
| 31 | Aniline | 0.2 | 2,000 |
| 32 | do | 0.5 | 4,400 |
| 33 | α-Naphthylamine | 1 | >2,800 |
| 34 | β-Naphthylamine | 1 | >1,500 |
| 35 | o-Phenylenediamine | 1 | >1,500 |
| 36 | N-phenyl N-benzylamine | 1 | >4,000 |

NOTE.—The polymerization is stopped with several amines, and the metallic catalytic residues as well as the added amine are left in the polymer.

this mixture (Tenamene 2, Eastman Chemical Products Inc.) per 100 parts of polymer. The induction period at 130° C. of the resulting polyepoxypropane is higher than 7,200 minutes.

VULCANIZATION

Examples a, b, f illustrate this invention.
Examples c, d, e, g are given by way of comparison.
The results are given in tables V and VI.
In examples a, b, c, d, e the operating conditions were as follows:

polymer: polyepoxypropane manufactured according to the process of the above-mentioned Belgian Pat. (the catalyst contained zinc and aluminum)

curing at 130° C. for 30 min.

peroxide: that having the above-given developed formula, used in an amount of five parts of peroxide at a 40 percent concentration per 100 parts of gum by weight.

sulfur: 0.5 part per 100 parts by weight of gum

The experiments a and b have been carried out on not-deashed polymers to which an amine had been added, whereas experiments c, d, and e were carried out on deashed polymers to which conventional stabilizers had been added.

Examples f and g have been carried out under substantially identical conditions, except that 45 g. of carbon black were added per each 100 g. of gum.

TABLE V

| Ex. | Reaction mixture | percent reticulated gum | Breaking load, kg./cm.² | Module at 300%, kg./cm.² | Lengthening at rupture, percent | Hardness D.I.D.C.[1] |
|---|---|---|---|---|---|---|
| a | Ash-containing polymer plus aniline | 86 | 154 | 15.5 | 925 | 61 |
| b | Ash-containing polymer plus isopropylamine | 89 | 180 | 15.1 | 925 | 60 |
| c | Deashed polymer plus zinc dibutyldithiocarbamate | 85 | 94.5 | 11.1 | 775 | 50.5 |
| d | Deashed polymer plus paraphenylenediamine | 74 | 41.5 | 10.7 | 600 | 52.3 |
| e | Deashed polymer plus phenothiazine | 80 | 88 | 13.4 | 750 | 50 |

[1] Internatinal degrees of rubber hardness. French standard NF-T-46,003.

TABLE VI

| | Example | |
|---|---|---|
| | f | g |
| | Not-deashed polymer plus isopropylamine | Deashed polymer plus nickel dibutyldithio carbamate |
| Breaking load, kg./cm.² | 180 | 131 |
| Module at 300%, kg./cm.² | 65 | 55 |
| Lengthening at rupture, percent | 750 | 660 |
| Hardness, D.I.D.C. | 78 | 64 |

What is claimed as this invention is:

1. A process for manufacturing a stabilized polymer of at least one saturated cyclic ether, comprising the successive steps of a. contacting at least one saturated cyclic ether having a ring containing three or four atoms with a catalyst to effect a polymerization reaction, said catalyst being obtained by reacting a compound of the formula:

with the compound

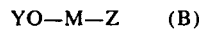

wherein M' is a trivalent metal, M a divalent metal, and Z an $OR_3$ or acyloxy radical, one of X and Y being a $R_4$ radical and the other being an acyl radical and $R_1$, $R_2$, $R_3$ and $R_4$ being monovalent hydrocarbon radicals, and b. stopping the polymerization reaction by adding to the reaction medium at least one amine selected from the group consisting of aniline, diphenylamine, N-phenyl-N-cyclohexylamine, toluidines, phenylenediamines, N-phenyl-N-benzylamine, cyclohexylamine, n-butylamine and diisobutylamine when the molecular weight of the polymer has reached a value corresponding to an intrinsic viscosity, measured at 30° C. in toluene, of at least 1; at least 0.05 gram-mole of the amine being added per gram-atom of divalent metal in the catalyst.

2. The process of claim 1 in which from 0.3 to 3 gram-mol. of said amine per gram-atom of divalent metal in the catalyst is added.

3. The process of claim 1 in which a molar ratio of the reactants A/B of 0.01 to 100 is used.

4. The process of claim 1 in which the divalent metal is zinc and the trivalent metal is aluminum.

5. The process of claim 1 in which the saturated cyclic ether is epoxypropane.

6. A process for manufacturing a stabilized polymer of epoxypropane, comprising the successive steps of a. contacting a monomer consisting essentially of epoxypropane with a catalyst to effect a polymerization reaction, said catalyst being obtained by reacting a compound of the formula:

with the compound

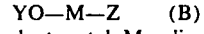

wherein M' is a trivalent metal, M a divalent metal, and Z an $OR_3$ or acyloxy radical, one of X and Y being a $R_4$ radical and the other being an acyl radical and $R_1$, $R_2$, $R_3$ and $R_4$ being monovalent hydrocarbon radicals, and b. stopping the polymerization reaction by adding at least about 0.05 gram-mole of aniline per gram-atom of divalent metal in the catalyst to the reaction medium when the molecular weight of the polymer has reached a value corresponding to an intrinsic viscosity, measured at 30° C. in toluene, of at least 1.

7. A stabilized polymer of at least one saturated cyclic ether having a ring containing three or four atoms, said polymer containing (1) the catalytic residue of a catalyst obtained by reacting a compound of the formula:

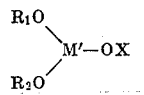 (A)

with a compound of the formula

YO—M—Z   (B) wherein M' is a trivalent metal, M a divalent metal and Z an $OR_3$ or acyloxy radical, one of X and Y being a $R_4$ radical and the other being an acyl radical and $R_1$, $R_2$, $R_3$ and $R_4$ being monovalent hydrocarbon radicals, and containing together with said catalytic residue (2) at least one amine selected from the group consisting of aniline, diphenylamine, N-phenyl-N-cyclohexylamine, toluidines, phenylenediamines, N-phenyl-N-benzylamine, cyclohexylamine, n-butylamine and diisobutylamine; said polymer containing at least 0.05 gram-mole of the amine per gram-atom of divalent metal in the catalyst.

8. The stabilized polymer of claim 7 in which the polymer is a homopolymer or copolymer of epoxypropane.

9. A vulcanized stabilized polymer of claim 7 in which said stabilized polymer is reacted with (a) a peroxide and (b) sulfur or a sulfur compound.

10. A vulcanized stabilized polymer of claim 9, in which the amine is aniline.

11. A vulcanized stabilized polymer of claim 9 in which 1.25 to 37.5 parts by weight of the peroxide and 0.2 to four parts by weight of the sulfur or sulfur compound are employed per 100 parts of polymer.

12. A vulcanized stabilized polymer of claim 11 in which the peroxide is selected from the group consisting of tert-butyl peroxide, cumene hydroperoxide, diisopropylbenzene dihydroperoxide, perbenzoic acid and perbenzoic acid esters.

13. A vulcanized stabilized polymer of claim 12 in which the sulfur compound is selected from the group consisting of alkylthiuram sulfides, sulfur dichloride, thiazoles and organic disulfides.

14. A vulcanized stabilized polymer of claim 9 in which the saturated cyclic ether is epoxypropane.

* * * * *